United States Patent
Matsumoto

(10) Patent No.: US 8,565,951 B2
(45) Date of Patent: Oct. 22, 2013

(54) CONTROLLER FOR AC ELECTRIC VEHICLE

(75) Inventor: Takeo Matsumoto, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 485 days.

(21) Appl. No.: 12/995,783

(22) PCT Filed: Jul. 31, 2008

(86) PCT No.: PCT/JP2008/063793
§ 371 (c)(1),
(2), (4) Date: Dec. 2, 2010

(87) PCT Pub. No.: WO2010/013343
PCT Pub. Date: Feb. 4, 2010

(65) Prior Publication Data
US 2011/0095602 A1    Apr. 28, 2011

(51) Int. Cl.
B60L 9/00    (2006.01)

(52) U.S. Cl.
USPC .............................. 701/22; 307/10.1; 307/22

(58) Field of Classification Search
USPC ............ 701/22; 307/10.1, 22, 26; 318/400.02
See application file for complete search history.

(56) References Cited

U.S. PATENT DOCUMENTS

| | | | |
|---|---|---|---|
| 5,250,890 A | 10/1993 | Tanamachi et al. | |
| 6,075,717 A * | 6/2000 | Kumar et al. | 363/87 |
| 7,064,967 B2 * | 6/2006 | Ichinose et al. | 363/56.01 |
| 7,880,331 B2 * | 2/2011 | Bax et al. | 307/46 |
| 8,085,009 B2 * | 12/2011 | Lumsden | 323/239 |
| 2003/0053324 A1 | 3/2003 | Yamamoto et al. | |
| 2004/0170038 A1 * | 9/2004 | Ichinose et al. | 363/95 |
| 2006/0092678 A1 * | 5/2006 | Ito | 363/125 |
| 2007/0189675 A1 | 8/2007 | Nagatsuka | |
| 2008/0157592 A1 * | 7/2008 | Bax et al. | 307/10.1 |
| 2008/0157593 A1 * | 7/2008 | Bax et al. | 307/10.1 |
| 2011/0043133 A1 * | 2/2011 | Van Laanen et al. | 315/294 |
| 2011/0095602 A1 | 4/2011 | Matsumoto | |
| 2011/0215641 A1 * | 9/2011 | Peterson et al. | 307/23 |
| 2011/0221367 A1 * | 9/2011 | Perisic et al. | 318/400.02 |
| 2012/0187876 A1 * | 7/2012 | Perisic et al. | 318/400.02 |

FOREIGN PATENT DOCUMENTS

| | | |
|---|---|---|
| DE | 37 25 515 A1 | 2/1989 |
| JP | 62-77867 A | 4/1987 |
| JP | 4-289703 | 10/1992 |
| JP | 04-289703 A | 10/1992 |

(Continued)

OTHER PUBLICATIONS

International Search Report (PCT/ISA/210) dated Aug. 26, 2008.

(Continued)

Primary Examiner — Helal A Algahaim
(74) Attorney, Agent, or Firm — Buchanan Ingersoll & Rooney PC

(57) ABSTRACT

In a controller for an AC electric vehicle that includes a converter control unit controlling an operation of a PWM converter that converts an AC voltage inputted from an AC overhead line through a transformer into an DC voltage, arithmetic processing performed in the converter control unit is divided into at least first to sixth arithmetic processing blocks, the first to sixth arithmetic processing blocks are configured by an FPGA, and the first to third arithmetic processing blocks, and the fourth and fifth arithmetic processing blocks are configured to enable simultaneous parallel processing, respectively.

22 Claims, 5 Drawing Sheets

(56) References Cited

FOREIGN PATENT DOCUMENTS

| JP | 07-322630 | | 12/1995 |
|----|-----------|---|---------|
| JP | 11-164565 | A | 6/1999 |
| JP | 2002-244875 | A | 8/2002 |
| JP | 2002-345252 | A | 11/2002 |
| JP | 2006-53742 | A | 2/2006 |
| JP | 2006-262599 | A | 9/2006 |
| JP | 2007-336632 | A | 12/2007 |
| JP | 2008-131833 | A | 6/2008 |
| JP | 2008-136265 | A | 6/2008 |
| JP | 4381467 | B1 | 12/2009 |
| RU | 2 110 136 | C1 | 4/1998 |
| WO | WO 91/03861 | A1 | 3/1991 |

OTHER PUBLICATIONS

Written Opinion (PCT/ISA/237) dated Aug. 26, 2008.

Korean Decision of a Patent Grant dated Dec. 26, 2012, issued in corresponding Korean Patent Application No. 519980960919. (2 pages).

Supplementary European Search Report dated Feb. 27, 2012, issued in the corresponding European Patent Application No. 08792008.8. (9 pages).

Carpita et al., "Multilevel Converter for Traction Applications: Small-Scale Prototype Tests Results" IEEE Transactions on Industrial Electronics, May 1, 2008, vol. 55, No. 5, pp. 2203-2212.

Shu et al., "FPGA-based Control of STATCOM using a Compact SVPWM Algorithm" Industrial Electronics, 2007, ISIE 2007, IEEE International Symposium on, Jun. 1, 2007, pp. 2348-2352.

Office Action (Decision on Grant) dated May 18, 2012, issued by the Russian Patent Office in the corresponding Russian Patent Application No. 2011107289 and partial English translation thereof. (17 pages).

Song et al., "Advanced Control Scheme for a Single-Phase PWM Rectifier in Traction Applications" IEEE Industry Applications Conference, 2003 IEEE, Oct, 2003, vol. 3, pp. 1558-1565.

Office Action (Notice of Preliminary Rejection) dated Jun. 25, 2012, issued in corresponding Korean Patent Application No. 10-2011-7001457, and an English Translation thereof. (11 pages).

Office Action issued on Oct. 21, 2011 in the corresponding Mexican Patent Application No. MX/a/2010/013810.

Office Action from European Patent Office dated May 10, 2013, issued in corresponding European Patent Application No. 08 79 2008.8. (9 pages)

Bilgin et al. "Reactive Power Compensation of Coal Mining Excavators by Using a New Generations Statcom," Conference Record of the 2005 IEEE Industry Applications Conference Fortieth IAS Annual Meeting Oct. 2-6, 2005 Kowloon, Hong Kong, China, Oct. 2, 2005, IEEE Cat., vol. 1, pp. 185-197, XP010842370 (14 pages).

"Altera Cyclone FPGA Family Datasheet," Apr. 1, 2003, pp. 1-97, XP55061641 USA, URL:http://www.altera.com/literature/ds/ds_cyc.pdf (98 pages).

Office Action from Canadian Patent Office dated Jul. 16, 2013, issued in corresponding Canadian Patent Appln. No. 2,732,239 (3 pages).

* cited by examiner

CONTROLLER FOR AC ELECTRIC VEHICLE

TECHNICAL FIELD

The present invention relates to a controller for an AC electric vehicle, and, more particularly to a controller for an AC electric vehicle that is adapted to process control arithmetic of a converter unit in an FPGA (Field Programmable Gate Array).

BACKGROUND ART

Patent Document 1 below discloses in FIG. 2, for example, a typical configuration of a converter control unit in a conventional controller for an AC electric vehicle. In conventional converter control units including the converter control unit disclosed in Patent Document 1, arithmetic processing by software using a DSP (Digital Signal Processor) is mostly performed because control arithmetic by converter control is often a collection of arithmetic operations mainly involving addition, subtraction, multiplication, and division of analog values and can be configured easily by arithmetic operations of floating-point numbers.

Patent Document 1: Japanese Patent Application Laid-open No. S62-77867

DISCLOSURE OF INVENTION

Problem to be Solved by the Invention

As described above, the arithmetic processing by software using the DSP is mainly configured in the converter control unit of the conventional controller for an AC electric vehicle.

However, in the case of software arithmetic processing using the DSP, the processing speed cannot usually be increased as compared to hardware arithmetic, which makes it difficult to further improve control accuracy.

When the software arithmetic using the DSP is mainly performed, unintended delays or differences in timing are produced during data exchange between a control module (hardware) with a relatively higher processing speed and a control module (software) with a lower processing speed. Consequently, asynchronous components of a power frequency, which are ideally not produced, are superimposed on harmonics of a return current produced by a converter operation and may interfere with operations of other signal devices.

The configuration can be changed to one mainly performing arithmetic processing by the FPGA instead of the arithmetic processing by software using the DSP. However, the converter control unit performs the arithmetic operations mainly involving addition, subtraction, multiplication, and division of analog values, and accordingly the FPGA that performs arithmetic operations of fixed-point numbers requires a larger number of bits to achieve the arithmetic operations with accuracy. Consequently, arithmetic operations at high processing speeds, which are inherent characteristics of the FPGA, become difficult.

The present invention has been achieved in view of the above problems, and an object of the present invention is to provide a controller for an AC electric vehicle that can suppress reduction in a processing speed to ensure desired control accuracy and can decrease impacts on return harmonies when control arithmetic in a converter control unit is processed by an FPGA.

Means for Solving Problem

To solve the problems as above-mentioned and to achieve the object, a controller for an AC electric vehicle is applied to an AC electric vehicle having a pulse-width modulation (PWM) converter that converts an AC voltage inputted from an overhead line through a transformer into a DC voltage, and that comprises a converter control unit controlling an operation of the PWM converter, wherein arithmetic processing performed in the converter control unit is divided into a plurality of arithmetic processing blocks, and the divided arithmetic processing blocks are configured by a field programmable gate array (FPGA), and some of the divided arithmetic processing blocks are configured to enable simultaneous parallel processing.

Effect of the Invention

According to the controller for an AC electric vehicle of the present invention, the arithmetic processing to be performed in the converter control unit is divided into the plural arithmetic processing blocks. The divided arithmetic processing blocks are configured by the FPGA, and some of the divided arithmetic processing blocks are configured to enable simultaneous parallel processing. Therefore, reduction in the processing speed can be suppressed to ensure desired control accuracy, and impacts on return harmonics can be decreased.

Figure 1:
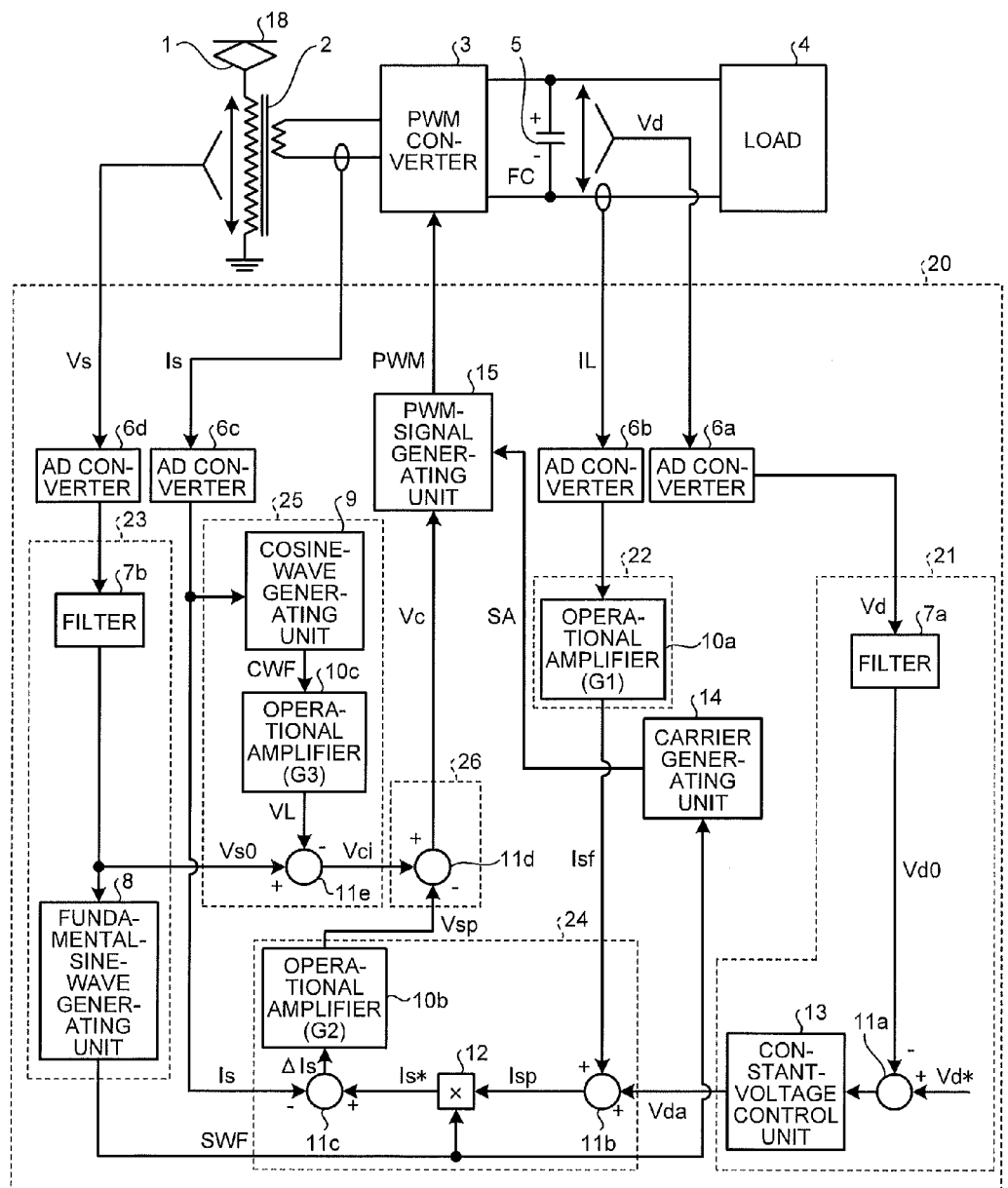
FIG. 1 is a functional block diagram mainly depicting a configuration of a converter control unit according to an embodiment of the present invention.

EXPLANATIONS OF LETTERS OR NUMERALS 1 pantograph
2 main transformer
3 PWM converter
4 load
6a to 6d A/D converter
7a, 7b filter
8 fundamental-sine-wave generating unit
9 cosine-wave generating unit
10a to 10c operational amplifier
11a to 11e adder/subtractor
12 multiplier
13 constant-voltage control unit
14 carrier generating unit
15 PWM-signal generating unit
18 overhead line
20 converter control unit
21 first arithmetic processing unit
22 second arithmetic processing unit
23 third arithmetic processing unit
24 fourth arithmetic processing unit
25 fifth arithmetic processing unit
26 sixth arithmetic processing unit
31 signal-input processing•A/D-conversion processing block 32A first arithmetic processing block
32B second arithmetic processing block
32C third arithmetic processing block
33A fourth arithmetic processing block
33B fifth arithmetic processing block
34A sixth arithmetic processing block
34B seventh arithmetic processing (carrier-wave generation processing) block
35 eighth arithmetic processing (PWM-signal generation processing) block
36 signal-output processing block
41 first processing period
42 second processing period
43 third processing period
44 fourth processing period
45 fifth processing period
46 sixth processing period
51 A/D conversion processing for converter DC voltage Vd
52 A/D conversion processing for converter output current IL
53 A/D conversion processing for overhead line voltage Vs
54 A/D conversion processing for converter input current Is
55 signal input processing for DC voltage reference Vd*
56 input processing for gain constants G1, G2, and G3
57 input processing for filter constants

BEST MODE(S) FOR CARRYING OUT THE INVENTION

Exemplary embodiments of a controller for an AC electric vehicle according to the present invention will be explained below in detail with reference to the accompanying drawings. The present invention is not limited to the embodiments.

FIG. 1 is a functional block diagram mainly depicting a configuration of a converter control unit according to an embodiment of the present invention. A driving system of an AC electric vehicle is shown in an upper part and a converter control unit 20 that constitutes a control system of the AC electric vehicle is shown in a lower part.

In FIG. 1, the driving system of the AC electric vehicle includes a pantograph 1 to which AC power is inputted from an AC overhead line 18, a main transformer 2 having the AC power supplied from the pantograph 1 as an input, an pulse-width modulation (PWM) converter 3 that is applied with an AC voltage of the main transformer 2 and converts the applied AC voltage to a DC voltage, a filter capacitor (hereinafter, FC) 5 that smoothes the DC voltage of the PWM converter 3, and a load 4 that is driven by the DC voltage smoothed by the FC 5. The load 4 includes an inverter that converts the DC voltage outputted from the PWM converter 3 into an AC voltage, an AC motor to which the AC voltage of the inverter is inputted, a railroad vehicle driven by the AC motor, and the like.

On the other hand, the converter control unit 20 that constitutes the control system of the AC electric vehicle includes first to sixth arithmetic processing units 21 to 26, a carrier generating unit 14, an PWM-signal generating unit 15, and analog/digital (AD) converters 6 (6a to 6d).

The first arithmetic processing unit 21 includes a filter 7a, an adder/subtractor 11a, and a constant-voltage control unit 13, and calculates a DC-voltage correction amount Vda based on a predetermined DC voltage reference Vd* internally generated and an actual converter DC voltage Vd. A detection value which is a detected voltage between both ends of the FC 5 can be used as the converter DC voltage Vd, for example, as shown in FIG. 1.

The second arithmetic processing unit 22 includes an operational amplifier ("G1" in FIG. 1 denotes a gain value. Hereinafter, gain values are similarly denoted.) 10a, and calculates a feedforward amount (hereinafter, "secondary-current feedforward amount") Isf of a converter input current based on a converter output current IL. A detection value that is obtained by detecting a current flowing through a DC bus that connects the PWM converter 3 and the load 4 can be used as the converter output current IL, for example, as shown in FIG. 1.

The third arithmetic processing unit 23 includes a filter 7b and a fundamental-sine-wave generating unit 8, and calculates a fundamental sine wave SWF based on a filter output of an overhead line voltage Vs. The third arithmetic processing unit 23 also outputs an overhead line voltage Vs0 through the filter 7b in addition to the fundamental sine wave SWF.

The fourth arithmetic processing unit 24 includes adders/subtractors 11b and 11c, a multiplier 12, and an operational amplifier 10b, and calculates a first correction amount Vsp required for generation of a converter voltage reference Vc, which will be explained later, based on the DC-voltage correction amount Vda, the secondary-current feedforward amount Isf, the fundamental sine wave SWF, and a converter input current Is.

The fifth arithmetic processing unit 25 includes a cosine-wave generating unit 9, an operational amplifier 10c, and an adder/subtractor 11e, and calculates a second correction amount Vci required for the generation of the converter voltage reference Vc based on the overhead-line-voltage filter output Vs0 and the converter input current Is.

The sixth arithmetic processing unit 26 includes an adder/subtractor 11d, and calculates the converter voltage reference Vc based on the first correction amount Vsp and the second correction amount Vci.

The carrier generating unit 14 calculates a carrier SA required for generation of a PWM signal based on the fundamental sine wave SWF.

The PWM-signal generating unit 15 generates a PWM signal for driving a switching element (not shown) included in the PWM converter 3 based on the converter voltage reference Vc and the carrier SA, and outputs the PWM signal.

While FIG. 1 depicts the configuration including the second arithmetic processing unit 22 that calculates the secondary-current feedforward amount Isf, the converter control can be realized without the second arithmetic processing unit 22. However, the second arithmetic processing unit 22 can perform simultaneous arithmetic and is one of processing units that are keys to explanations of the operation according to the present embodiment. Therefore, following explanations are given on the assumption that the second arithmetic processing unit 22 is included.

Figure 2:
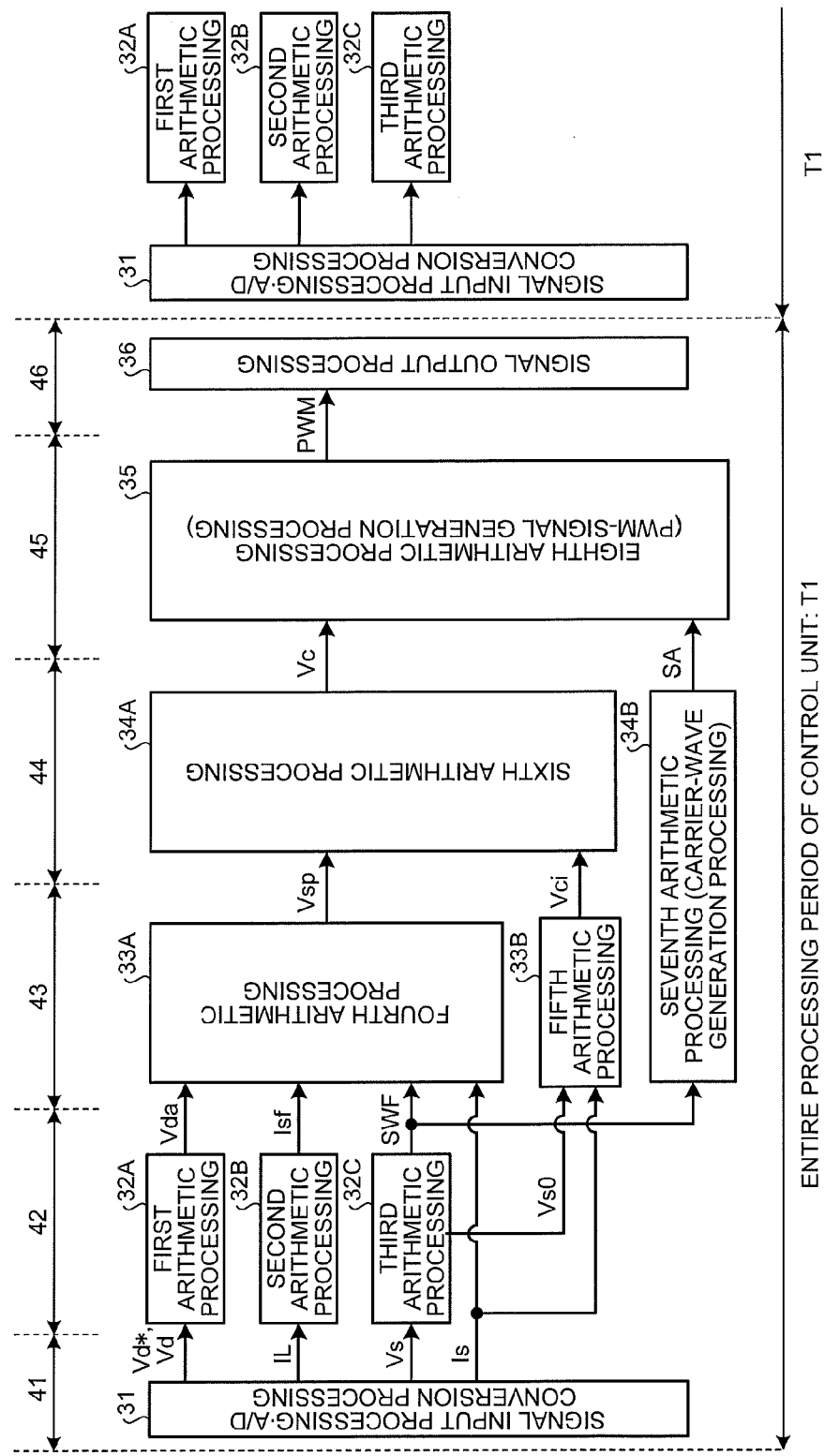
FIG. 2 depicts a flow of processes performed by the converter control unit 20 shown in FIG. 1.

A detailed operation of the converter control unit 20 is explained next with reference to FIGS. 1 and 2. FIG. 2 depicts a flow of processes performed by the converter control unit 20 shown in FIG. 1.

In the converter control unit 20 according to the present embodiment, arithmetic processing and the like of the respective constituent elements performed in the converter control unit 20 is divided into six processing periods from a first processing period 41 to a sixth processing period 46 within an entire processing period T1 of the converter control unit, as shown in FIG. 2. Specifically, a process by a signal-input processing•A/D (analog/digital)-conversion processing block 31 is performed in the first processing period 41, and processes by a first arithmetic processing block 32A, a second arithmetic processing block 32B, and a third arithmetic processing block 32C are performed in the second processing period 42. Processes by a fourth arithmetic processing block 33A and a fifth arithmetic processing block 33B are performed in the third processing period 43, and processes by a sixth arithmetic processing block 34A and a seventh arithmetic processing (carrier-wave generation processing) block 34B are performed in the fourth processing period 44. A process by an eight arithmetic processing (PWM-signal generation processing) block 35 is performed in the fifth processing period 45, and a process by a signal-output processing block 36 is performed in the sixth processing period 46.

While FIG. 2 depicts a case where start times of the respective processes by the fifth arithmetic processing block 33B and the seventh arithmetic processing block 34B are aligned with a start time of the process by the fourth arithmetic processing block 33A, the present embodiment is not limited to this case. For example, the fifth arithmetic processing block 33B can start the process prior to the fourth arithmetic processing block 33A, or can set a start point of the process at an arbitrary point during the third processing period 43 so that a complete time of the process is almost aligned with a complete time of the process by the fourth arithmetic processing block 33A. The seventh arithmetic processing block 34B can set a start point of the process at an arbitrary point during the processing periods of the third processing period 43 and the fourth processing period 44 so that a complete time of the process is almost aligned with a complete time of the process by the sixth arithmetic processing block 34A.

The respective processing blocks are explained next. The signal-input processing•A/D-conversion processing block 31 includes A/D conversion processing performed in the A/D converters 6a to 6d, set processing for the gains performed in the operational amplifiers 10a to 10c, input processing for the filter constants performed in the filters 7a and 7b, and the like. The first arithmetic processing block 32A corresponds to the processing performed by the first arithmetic processing unit 21. Similarly, the second arithmetic processing block 32B corresponds to the processing performed by the second arithmetic processing unit 22, the third arithmetic processing block 32C corresponds to the processing performed by the third arithmetic processing unit 23, the fourth arithmetic processing block 33A corresponds to the processing performed by the fourth arithmetic processing unit 24, the fifth arithmetic processing block 33B corresponds to the processing performed by the fifth arithmetic processing unit 25, and the sixth arithmetic processing block 34A corresponds to the processing performed by the sixth arithmetic processing unit 26. The seventh arithmetic processing (carrier-wave generation processing) block 34B corresponds to the processing performed by the carrier generating unit 14, and the eighth arithmetic processing (PWM-signal generation processing) block 35 corresponds to the processing performed by the PWM-signal generating unit 15. The signal-output processing block 36 corresponds to interface processing performed when the PWM signal is outputted to the PWM converter 3, and the like.

The operation of the converter control unit 20 according to the present embodiment is explained next in relation to the constituent elements shown in FIG. 1 and the processing blocks shown in FIG. 2.

(Operation of First Arithmetic Processing Unit 21)

The converter output voltage Vd inputted to the converter control unit 20 is converted by the A/D converter 6a into a digital signal (the signal-input processing•A/D-conversion processing block 31). The obtained digital signal is inputted to the filter 7a of the first arithmetic processing unit 21. The adder/subtractor 11a then calculates a difference between the DC voltage reference Vd* and the output Vd0 of the filter 7a, and the constant-voltage control unit 13 calculates the DC-voltage correction amount Vda (the first arithmetic processing block 32A).

(Operation of Second Arithmetic Processing Unit 22)

The converter output current IL inputted to the converter control unit 20 is converted by the A/D converter 6b into a digital signal (the signal-input processing•A/D-conversion processing block 31). The obtained digital signal is multiplied by the gain G1 in the operational amplifier 10a of the second arithmetic processing unit 22 to calculate the secondary-current feedforward amount Isf (the second arithmetic processing block 32B).

(Operation of Third Arithmetic Processing Unit 23)

The overhead line voltage Vs inputted to the converter control unit 20 is converted by the A/D converter 6d into a digital signal (the signal-input processing•A/D-conversion processing block 31). The obtained digital signal is inputted to the filter 7b of the third arithmetic processing unit 23 to generate the overhead-line-voltage filter output Vs0, and the overhead-line-voltage filter output Vs0 is inputted to the fundamental-sine-wave generating unit 8 to calculate the fundamental sine wave SWF (the third arithmetic processing block 32C).

The operations of the first arithmetic processing units 21 to the third arithmetic processing units 23 can be processed simultaneously in parallel, and therefore can be performed as arithmetic processings using different circuits on the FPGA.

(Operation of Fourth Arithmetic Processing Unit 24)

The converter input current Is inputted to the converter control unit 20 is converted by the A/D converter 6c into a digital signal (the signal-input processing•A/D-conversion processing block 31). The DC-voltage correction amount Vda, the secondary-current feedforward amount Isf, and the fundamental sine wave SWF, which are outputs from the first arithmetic processing unit 21 to the third arithmetic processing units 23 are inputted to the fourth arithmetic processing unit 24. The DC-voltage correction amount Vda and the secondary-current feedforward amount Isf are inputted to the adder/subtractor 11b of the fourth arithmetic processing unit 24. An addition output Isp therefrom is multiplied by the fundamental sine wave SWF in the multiplier 12 to calculate a converter-input current reference Is*. A deviation ΔIs between the converter-input current reference Is* and the converter input current Is converted into the digital signal by the A/D converter 6c is calculated by the adder/subtractor 11c. The operational amplifier 10b calculates the first correction amount Vsp by multiplying the deviation ΔIs by the gain G2 (these correspond to the fourth arithmetic processing block 33A).

(Operation of Fifth Arithmetic Processing Unit 25)

The converter input current Is converted into the digital signal by the A/D converter 6c is inputted also to the cosine-wave generating unit 9 of the fifth arithmetic processing unit 25 (the signal-input processing•A/D-conversion processing block 31). In the fifth arithmetic processing unit 25, the cosine-wave generating unit 9 generates a cosine wave CWF based on the converter input current Is, and the operational amplifier 10c calculates a correction amount VL by multiplying the cosine wave CWF by the gain G3. The calculated correction amount VL and the overhead-line-voltage filter output Vs0 inputted from the third arithmetic processing unit 23 are inputted to the adder/subtractor 11e. A subtraction output therefrom is calculated as the second correction amount Vci (these correspond to the fifth arithmetic processing block 33B).

The operations of the fourth arithmetic processing unit 24 and the fifth arithmetic processing unit 25 also can be processed simultaneously in parallel, and accordingly can be performed as arithmetic processings using different circuits on the FPGA.

(Operation of Sixth Arithmetic Processing Unit 26)

The first correction amount Vsp and the second correction amount Vci, which are the outputs from the fourth and fifth arithmetic processing units 24 and 25, respectively, are inputted to the adder/subtractor 11d of the sixth arithmetic processing unit 26. A subtraction output therefrom is calculated as the converter voltage reference Vc (the sixth arithmetic processing block 34A).

(Operation of Carrier Generating Unit 14)

The carrier generating unit 14 calculates the carrier SA required for generation of the PWM signal based on the fundamental sine wave SWF inputted from the third arithmetic processing unit 23 (the seventh arithmetic processing block 34B). The arithmetic processing of the carrier generating unit 14 can be performed in parallel with the arithmetic processing of the fourth arithmetic processing unit 24 and the fifth arithmetic processing unit 25, or in parallel with the arithmetic processing of the sixth arithmetic processing unit 26.

(Operation of PWM-Signal Generating Unit 15)

The PWM-signal generating unit 15 generates a PWM control signal for driving the PWM converter 3 based on the converter voltage reference Vc calculated by the sixth arithmetic processing unit 26 and the SA calculated by the carrier generating unit 14 (the eighth arithmetic processing block 35). The generated PWM control signal is outputted to the PWM converter 3 (the signal-output processing block 36).

As described above, the converter control unit according to the present embodiment performs the respective arithmetic processing within the entire processing period T1 of the converter control unit, and performs the respective arithmetic processing by the FPGA so that the arithmetic processing is completed within the processing period T1.

Figure 3:
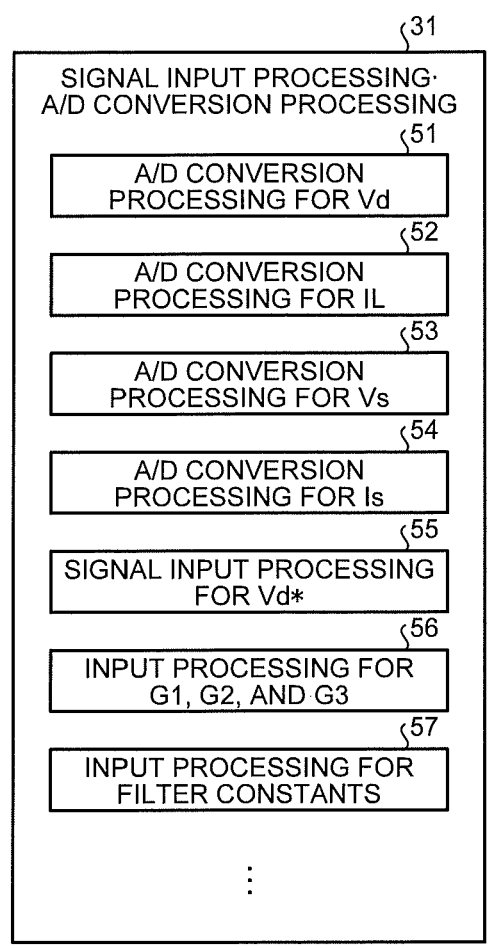
FIG. 3 depicts details of processing performed by a signal-input processing•A/D-conversion processing block shown in FIG. 2.

FIG. 3 depicts details of the processing performed by the signal-input processing•A/D-conversion processing block shown in FIG. 2. As shown in FIG. 3, the signal-input processing•A/D-conversion processing block 31 performs processing such as A/D conversion processing 51 for the converter DC voltage Vd, A/D conversion processing 52 for the converter output current IL, A/D conversion processing 53 for the overhead line voltage Vs, A/D conversion processing 54 for the converter input current Is, signal input processing 55 for the DC voltage reference Vd*, input processing 56 for the gain constants G1, G2, and G3, and input processing 57 for the filter constants.

When arithmetic of a converter control unit is realized by an FPGA, constants to be used in respective arithmetic can be incorporated into the FPGA. However, alteration of FPGA logics requires a special device as compared to alteration of software logics and complicates operations. Accordingly, when the constants of the control unit are to be changed at an adjustment stage, for example, the change operation cannot be performed easily and a long time is required for the adjustment.

Meanwhile, the converter control unit according to the present embodiment has the configuration in which setting or change of the gain constants G1 to G3 and the filter constants to be used for the control arithmetic in the signal-input processing•A/D conversion processing block 31 is performed by reading from software, as shown in FIG. 3, and therefore a long time is not required for adjustment. That is, in the converter control unit according to the present embodiment, the change of the gain constants and the filter constants is realized by change of software. Therefore, any special device or procedures like in the change of the FPGA-incorporated constants are not required, which facilitates adjustment and achieves time reduction.

While the reading of the gain constants and the filter constants is performed at the beginning of each processing period in the processing shown in FIGS. 2 and 3, the present embodiment is not limited thereto. For example, the reading process can be performed at predetermined timing such as immediately after power activation. Also in such a case, similar effects to those of the present embodiment can be obtained.

As described above, according to the controller for an AC electric vehicle of the present embodiment, when arithmetic of the converter control unit is realized by the FPGA, some pieces of arithmetic processing that can be performed simultaneously among plural pieces of arithmetic processing required for the converter control are combined and performed in parallel. Therefore, high-speed processing can be achieved while the arithmetic operations of the fixed-point numbers with a larger number of bits are performed.

According to the controller for an AC electric vehicle of the present embodiment, the plural pieces of arithmetic processing required for the converter control can be all completed within the processing by the FPGA. Therefore, unintended delays in processing or differences in timing between control modules having different processing speeds can be avoided. As a result, the return harmonics produced by the converter operation can be reduced, and impacts on the operations of other signal devices can be decreased.

According to the controller for an AC electric vehicle of the present embodiment, change of the gain constants and the filter constants used in the control arithmetic can be achieved by change of software. Therefore, any special device or procedures like in change of the FPGA-incorporated constants are not required, which facilitates the adjustment and reduces the adjustment time.

Figure 4:
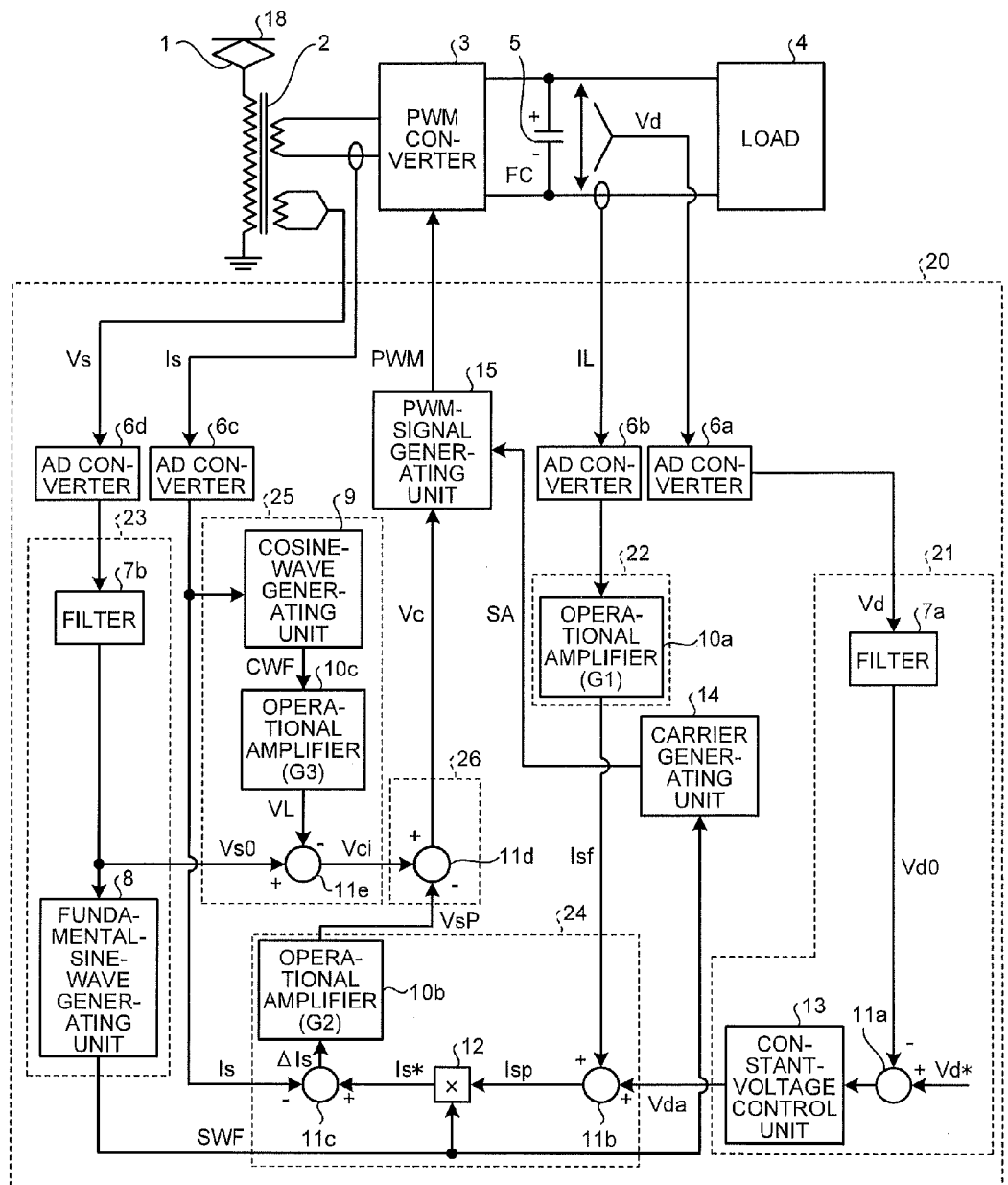
FIG. 4 depicts a configuration of a controller applied to an AC electric vehicle having a configuration different from that shown in FIG. 1.

FIG. 4 depicts a configuration of a controller applied to an AC electric vehicle having a configuration different from that shown in FIG. 1. In the controller shown in FIG. 1, the voltage on a primary side of the main transformer 2 is monitored as the overhead line voltage Vs. Meanwhile, in the controller shown in FIG. 4, a voltage on a tertiary side of the main transformer 2 is monitored. Even with the configuration that monitors the voltage on the tertiary side of the main transformer 2, when the converter control unit 20 has the same or equivalent configuration as that shown in FIG. 1, similar effects to those of the controller as described above can be obtained, of course.

Figure 5:
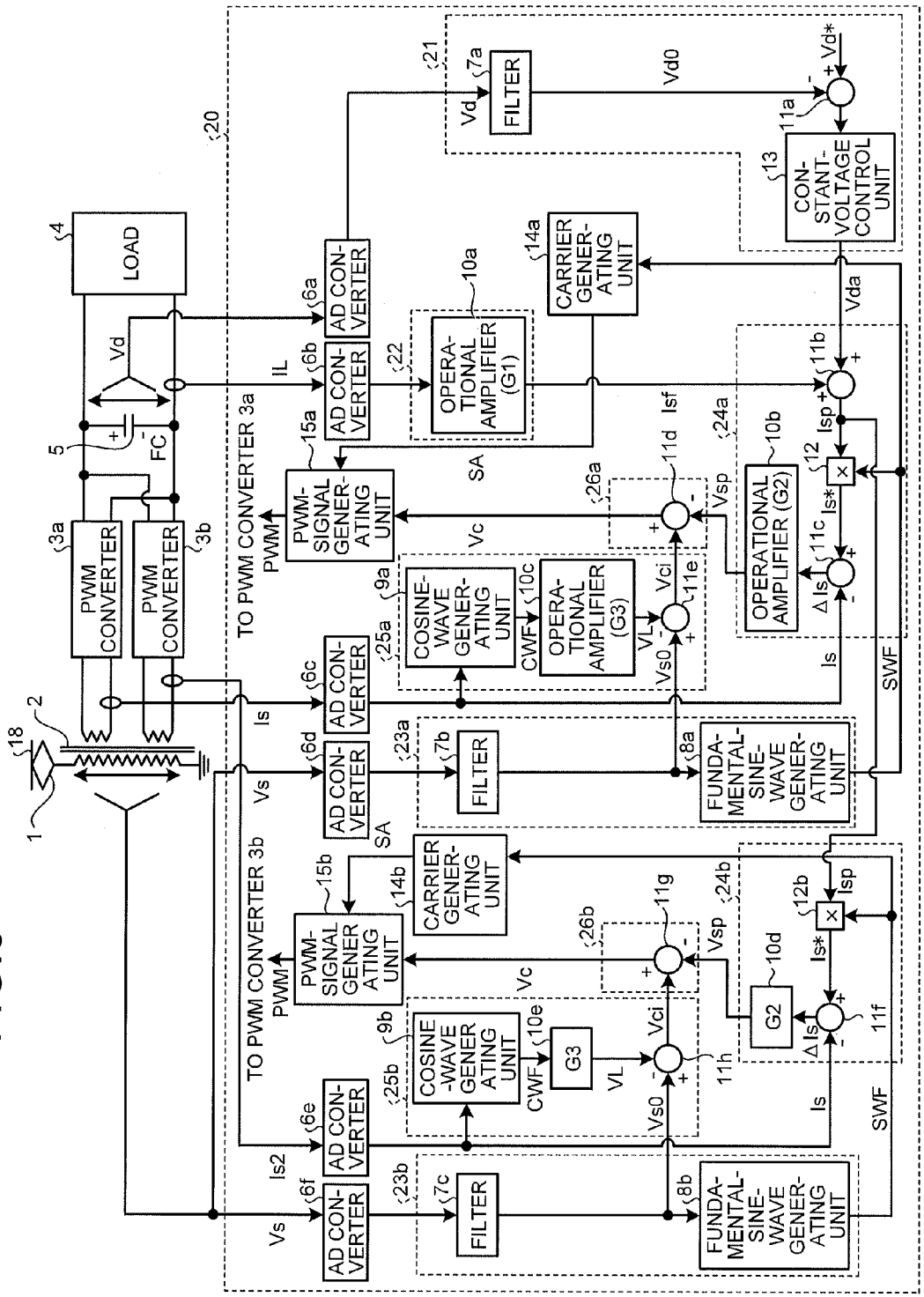
FIG. 5 depicts a configuration of a controller applied to an AC electric vehicle having a configuration different from those shown in FIGS. 1 and 4.

FIG. 5 depicts a configuration of a controller applied to an AC electric vehicle having a configuration different from those shown in FIGS. 1 and 4. While the AC electric vehicle shown in FIG. 1 has the configuration including one PWM converter, the AC electric vehicle shown in FIG. 5 has a configuration including two PWM converters connected in parallel to a load. In the AC electric vehicle with this configuration, the first arithmetic processing unit 21 and the second arithmetic processing unit 22 are shared, and the third arithmetic processing unit 23 to the sixth arithmetic processing unit 26, the carrier generating unit 14, and the PWM-signal generating unit 15 are provided, respectively, as shown in FIG. 5. In this way, processing divided into the arithmetic processing blocks like in FIG. 2 can be realized. Therefore, even with the configuration of the controller shown in FIG. 5, similar effects to those of the controller as described above can be obtained, of course.

Further, in the controller according to the present embodiment, the arithmetic processing blocks other than the signal-input processing•A/D-conversion processing block 31 and the signal-output processing block 36 are divided into the first to eighth arithmetic processing blocks. Therefore, even when specifications and the configuration of the AC electric vehicle, or specifications and the configuration of the controller are changed as shown in FIGS. 1, 4, and 5, change of only associated arithmetic blocks corresponding to the change in the specifications or the like is required. Accordingly, change or adjustment of models can be facilitated and time reduction can be achieved. Further, also in case of failure such as breakdown, a broken portion can be easily separated and therefore facility in recovery and reliability of the controller can be increased.

When the arithmetic processing of the controller is divided into the first to eighth arithmetic processing blocks like in the present embodiment, respective resources are reduced in size and flexibility in arrangement on the FPGA is increased. Accordingly, it is possible to configure a plurality of relatively smaller FPGAs while maintaining high-speed arithmetic processing, which reduces the entire size of the controller.

INDUSTRIAL APPLICABILITY

As described above, the controller for an AC electric vehicle according to the present invention is useful as an invention that can process control arithmetic of a converter unit in an FPGA.

The invention claimed is:

1. A controller for an AC electric vehicle that is applied to an AC electric vehicle having a pulse-width modulation (PWM) converter that converts an AC voltage inputted from an overhead line through a transformer into a DC voltage, and that comprises a converter control unit controlling an operation of the PWM converter, wherein
the converter control unit is divided into plural arithmetic processing units configured by a field programmable gate array (FPGA), and
the arithmetic processing units configured by the FPGA include:
a first arithmetic processing unit that calculates a DC-voltage correction amount based on a predetermined DC voltage reference and a DC voltage of the PWM converter to output the DC-voltage correction amount;
a third arithmetic processing unit that performs processing simultaneously in parallel with the first arithmetic processing unit, and calculates a fundamental sine wave based on an overhead line voltage through a filter to output the fundamental sine wave;
a fourth arithmetic processing unit that calculates a first correction amount associated with generation of a converter voltage reference, based on the DC-voltage correction amount, the fundamental sine wave, and an input current of the PWM converter to output the first correction amount;
a fifth arithmetic processing unit that performs processing simultaneously in parallel with the fourth arithmetic processing unit, and calculates a second correction amount associated with the generation of the converter voltage reference, based on a filter output of the overhead line voltage and the input current of the PWM converter to output the second correction amount; and
a sixth processing unit that calculates the converter voltage reference based on the first and second correction amounts to output the converter voltage reference.

2. The controller for an AC electric vehicle according to claim 1, wherein the arithmetic processing units configured by the FPGA include a second arithmetic processing unit that performs processing simultaneously in parallel with the first and third arithmetic processing units, and calculates a feedforward amount for the input current of the PWM converters based on an output current of the PWM converters to output the feedforward amount.

3. The controller for an AC electric vehicle according to claim 1, wherein
the arithmetic processing units configured by the FPGA include:
a seventh arithmetic unit that performs processing simultaneously in parallel with the sixth arithmetic processing unit, and calculates a carrier associated with generation of a PWM signal for driving the PWM converters, based on the fundamental sine wave to output the carrier; and
an eight arithmetic processing unit that calculates the PWM signal based on the converter voltage reference and the carrier to output the PWM signal.

4. The controller for an AC electric vehicle according to claim 1, wherein the arithmetic processing units configured by the FPGA include a signal-input processing•A/D-conversion processing unit that reads constants to be used in arithmetic by the arithmetic processing units configured by the FPGA in predetermined timing within each arithmetic processing period.

5. The controller for an AC electric vehicle according to claim 2, wherein the arithmetic processing units configured by the FPGA include a signal-input processing•A/D-conversion processing unit that reads constants to be used in arithmetic by the arithmetic processing units configured by the FPGA in predetermined timing within each arithmetic processing period.

6. The controller for an AC electric vehicle according to claim 3, wherein the arithmetic processing units configured by the FPGA include a signal-input processing•A/D-conversion processing unit that reads constants to be used in arithmetic by the arithmetic processing units configured by the FPGA in predetermined timing within each arithmetic processing period.

7. The controller for an AC electric vehicle according to claim 4, wherein the signal-input processing•A/D conversion processing unit performs setting or change of the constants to be used in the arithmetic by the arithmetic processing units by reading from software.

8. The controller for an AC electric vehicle according to claim 5, wherein the signal-input processing•A/D conversion processing unit performs setting or change of the constants to be used in the arithmetic by the arithmetic processing units by reading from software.

9. The controller for an AC electric vehicle according to claim 6, wherein the signal-input processing•A/D conversion processing unit performs setting or change of the constants to be used in the arithmetic by the arithmetic processing units by reading from software.

10. A controller for an AC electric vehicle that is applied to an AC electric vehicle having a plurality of PWM converters that convert an AC voltage inputted from an overhead line through a transformer into a DC voltage, and that comprises a converter control unit controlling operations of the PWM converters that are connected in parallel to a load, wherein
the converter control unit is divided into plural arithmetic processing units configured by an FPGA, and
the arithmetic processing units configured by the FPGA include:
a first arithmetic processing unit that calculates a DC-voltage correction amount based on a predetermined DC voltage reference and a DC voltage of the PWM converter to output the DC-voltage correction amount;

a third arithmetic processing unit that performs processing simultaneously in parallel with the first arithmetic processing unit, and calculates a fundamental sine wave based on an overhead line voltage through a filter to output the fundamental sine wave;

a fourth arithmetic processing unit that calculates a first correction amount associated with generation of a converter voltage reference, based on the DC-voltage correction amount, the fundamental sine wave, and an input current of the PWM converters to output the first correction amount;

a fifth arithmetic processing unit that performs processing simultaneously in parallel with the fourth arithmetic processing unit, and calculates a second correction amount associated with the generation of the converter voltage reference, based on a filter output of the overhead line voltage and the input current of the PWM converters to output the second correction amount; and a sixth processing unit that calculates the converter voltage reference based on the first and second correction amounts to output the converter voltage reference.

11. The controller for an AC electric vehicle according to claim 10, wherein the arithmetic processing units configured by the FPGA include a second arithmetic processing unit that performs processing simultaneously in parallel with the first and third arithmetic processing units, and calculates a feedforward amount for the input current of the PWM converters based on an output current of the PWM converters to output the feedforward amount.

12. The controller for an AC electric vehicle according to claim 10, wherein
the arithmetic processing units configured by the FPGA include:
a seventh arithmetic unit that performs processing simultaneously in parallel with the sixth arithmetic processing unit, and calculates a carrier associated with generation of a PWM signal for driving the PWM converters, based on the fundamental sine wave to output the carrier; and
an eighth arithmetic processing unit that calculates the PWM signal based on the converter voltage reference and the carrier to output the PWM signal.

13. The controller for an AC electric vehicle according to claim 10, wherein
the first arithmetic processing unit is shared by the PWM converters, and
the third to sixth arithmetic processing units are provided to each of the PWM converters.

14. The controller for an AC electric vehicle according to claim 10, wherein the arithmetic processing units configured by the FPGA include a signal-input processing A/D-conversion processing unit that reads constants to be used in arithmetic by the arithmetic processing units configured by the FPGA in predetermined timing within each arithmetic processing period.

15. The controller for an AC electric vehicle according to claim 11, wherein the arithmetic processing units configured by the FPGA include a signal-input processing•A/D-conversion processing unit that reads constants to be used in arithmetic by the arithmetic processing units configured by the FPGA in predetermined timing within each arithmetic processing period.

16. The controller for an AC electric vehicle according to claim 12, wherein the arithmetic processing units configured by the FPGA include a signal-input processing•A/D-conversion processing unit that reads constants to be used in arithmetic by the arithmetic processing units configured by the FPGA in predetermined timing within each arithmetic processing period.

17. The controller for an AC electric vehicle according to claim 13, wherein the arithmetic processing units configured by the FPGA include a signal-input processing•A/D-conversion processing unit that reads constants to be used in arithmetic by the arithmetic processing units configured by the FPGA in predetermined timing within each arithmetic processing period.

18. The controller for an AC electric vehicle according to claim 14, wherein
the signal-input processing•A/D conversion processing unit performs setting or change of the constants to be used in the arithmetic by the arithmetic processing units by reading from software.

19. The controller for an AC electric vehicle according to claim 15, wherein
the signal-input processing•A/D conversion processing unit performs setting or change of the constants to be used in the arithmetic by the arithmetic processing units by reading from software.

20. The controller for an AC electric vehicle according to claim 16, wherein
the signal-input processing A/D conversion processing unit performs setting or change of the constants to be used in the arithmetic by the arithmetic processing units by reading from software.

21. The controller for an AC electric vehicle according to claim 17, wherein the signal-input processing•A/D conversion processing unit performs setting or change of the constants to be used in the arithmetic by the arithmetic processing units by reading from software.

22. A controller for an AC electric vehicle that is applied to an AC electric vehicle having a PWM converter that converts an AC voltage inputted from an overhead line through a transformer into a DC voltage, and that comprises a converter control unit controlling an operation of the PWM converter, wherein
arithmetic processing performed in the converter control unit is divided into a plurality of arithmetic processing blocks configured by an FPGA,
the arithmetic processing blocks configured by the FPGA include:
a first arithmetic processing block that calculates a DC-voltage correction amount based on a predetermined DC voltage reference and a DC voltage of the PWM converter to output the DC-voltage correction amount;
a second arithmetic processing block that calculates a feedforward amount for an input current of the PWM converter based on an output current of the PWM converter to output the feedforward amount;
a third arithmetic processing block that calculates a fundamental sine wave based on an overhead line voltage through a filter to output the fundamental sine wave;
a fourth arithmetic processing block that calculates a first correction amount associated with generation of a converter voltage reference, based on the DC-voltage correction amount, the fundamental sine wave, and the input current of the PWM converter to output the first correction amount;
a fifth arithmetic processing block that calculates a second correction amount associated with the generation of the converter voltage reference, based on a filter output of the overhead line voltage and the input current of the PWM converter to output the second correction amount;

a sixth arithmetic processing block that calculates the converter voltage reference based on the first and second correction amounts to output the converter voltage reference;

a seventh arithmetic processing block that calculates a carrier associated with generation of a PWM signal for driving the PWM converter, based on the fundamental sine wave to output the carrier; and an eighth arithmetic processing block that calculates the PWM signal based on the converter voltage reference and the carrier to output the PWM signal, the first, second, and third arithmetic processing blocks are subjected to arithmetic processing during a first processing period, the fourth and fifth arithmetic processing blocks are subjected to arithmetic processing during a second processing period following the first processing period, the sixth arithmetic processing block is subjected to arithmetic processing during a third processing period following the second processing period, the seventh arithmetic processing block is subjected to arithmetic processing during the second and third processing periods, and the eighth arithmetic processing block is subjected to arithmetic processing during a fourth processing period following the third processing period.

* * * * *